United States Patent
Fenton

(10) Patent No.: US 7,953,555 B2
(45) Date of Patent: May 31, 2011

(54) SEISMIC MEASUREMENT SYSTEM INCLUDING GPS RECEIVERS

(75) Inventor: Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 12/652,112

(22) Filed: Jan. 5, 2010

(65) Prior Publication Data

US 2010/0103030 A1      Apr. 29, 2010

Related U.S. Application Data

(63) Continuation of application No. 11/835,520, filed on Aug. 8, 2007, now Pat. No. 7,668,657, which is a continuation of application No. 11/502,086, filed on Aug. 10, 2006, now Pat. No. 7,526,386, which is a continuation of application No. 10/891,800, filed on Jul. 15, 2004, now Pat. No. 7,117,094.

(60) Provisional application No. 60/488,124, filed on Jul. 17, 2003.

(51) Int. Cl.
*G01V 1/00* (2006.01)
*G01S 19/31* (2010.01)

(52) U.S. Cl. ..................................... 702/14; 342/357.71

(58) Field of Classification Search ..................... 702/14, 702/1–2, 5, 16, 150–153, 155, 158–159; 340/540, 686.1; 342/118, 125, 127–128, 342/352, 357.1, 357.4, 357.9, 357.12, 357.15–357.16, 342/358, 357.34, 357.43–357.44, 357.61, 342/357.63–357.64, 357.71
See application file for complete search history.

(56) References Cited

U.S. PATENT DOCUMENTS

| 4,589,100 | A | 5/1986 | Savit |
| 6,067,852 | A | 5/2000 | Alber |
| 6,140,957 | A | 10/2000 | Wilson |
| 7,117,094 | B2 * | 10/2006 | Fenton ........................... 702/14 |
| 7,526,386 | B2 * | 4/2009 | Fenton ........................... 702/14 |
| 7,668,657 | B2 * | 2/2010 | Fenton ........................... 702/14 |

FOREIGN PATENT DOCUMENTS

WO      WO 01/55747      8/2001

OTHER PUBLICATIONS

Ray et al., GPS Code and Carrier Multipath Mitigation Using a Multiantenna System, Jan. 2001, IEEE Transactions on Aerospace and Electronic System, vol. 37, No. 1, pp. 183-195.*

(Continued)

*Primary Examiner* — Mohamed Charioui
*Assistant Examiner* — Toan M Le
(74) *Attorney, Agent, or Firm* — Cesari and McKenna, LLP; Patricia A. Sheehan

(57) ABSTRACT

A system for determining positions of fixed-position satellite signal receivers that have restricted views of the sky includes a data recording control center, and one or more base satellite signal receivers with associated antennas that together have substantially unrestricted views of the sky. The system batch processes range information provided by the fixed-position receivers over an extended period of time, determining the three dimensional position of a given fixed-position receiver using range data from at least three relatively short time intervals associated with different sky positions in which the receiver is tracking any two or more satellite signals simultaneously.

16 Claims, 2 Drawing Sheets

OTHER PUBLICATIONS

Harigae M. et al., "Control of Large Space Structures Using GPS-Modal Parameter Identification and Attitude and Deformation Estimation" Electronics & Communications in Japan, Part I—communications, Scripta Technica. New York, US, vol. 4, part 1, No. 86, Apr. 2003, pp. 63-71.

Reasons for Judgment of the Honorable Mr. Justice Alan D. Macleod dated Jul. 23, 2008.
Memorandum of Judgment dated Jul. 31, 2009.
Judgment dated Jan. 28, 2010.
Statement of Claim dated Jul. 6, 2006.

* cited by examiner

SEISMIC MEASUREMENT SYSTEM INCLUDING GPS RECEIVERS

CROSS-REFERENCE TO RELATED APPLICATIONS

The present application is a continuation of commonly assigned copending U.S. patent application Ser. No. 11/835,520, which was filed on Aug. 8, 2007, now U.S. Pat. No. 7,668,657, which is a continuation of U.S. patent application Ser. No. 11/502,086, now U.S. Pat. No. 7,526,386, which was filed on Aug. 10, 2006, which is a continuation of U.S. patent application Ser. No. 10/891,800, now U.S. Pat. No. 7,117,094, which was filed on Jul. 15, 2004, by Patrick C. Fenton which claimed priority from U.S. Provisional Application 60/488,124 filed on Jul. 17, 2003, now expired, all for a SEISMIC MEASURING SYSTEM INCLUDING GPS RECEIVERS and are each hereby incorporated by reference.

BACKGROUND OF THE INVENTION

1. Field of the Invention

The invention relates generally to seismic data collection systems and, in particular, to systems for collecting and analyzing three-dimensional seismic data.

2. Background Information

Systems for analyzing three-dimensional seismic data collect seismic measurements from configurations of geophones that are attached to and communicate with digitizer units (DUs), which that produce signals that correspond to the seismic measurements. The DUs, which are placed at selected locations along cables that span a site of interest, take readings from the configurations of geophones and send corresponding signals over the cables to a data recording and control center. The data is used to determine, for example, the likelihood that oil reserves are present on the site. A typical site may include thousands of DUs, each with an associated configuration of geophones.

Setting up and operating the measurement system is both time consuming and complex. The locations of the DUs must be known to within tight vertical and horizontal accuracy limits, and generally, the locations of the respective DUs are individually determined using optical survey techniques, GPS RTK "back-pack" systems or GPS/INS systems. In addition, the sites can no longer be cleared, that is, foliage cannot be removed at the selected locations of the DUs, and thus, the process of determining the locations of the DUs is made even more time consuming and complex when lines of sight are blocked.

The geophone readings taken by the DUs must be synchronized to within tight timing limits. In prior known systems, timing signals are sent along the cables and readings are taken at the various DUs in response to the signals. Accordingly, the lengths of the respective cables are limited, to avoid associated timing signal delays. Consequently, the area that can be tested at a given time is also limited by the lengths of the cables.

What is needed is a system that can be set up in a less time consuming manner and operate accurately over larger areas.

SUMMARY OF THE INVENTION

A system for analyzing three-dimensional seismic data includes, in addition to the DUs, the geophones and the data recording and control center, a base GPS receiver and an associated antenna with a substantially unrestricted view of the sky and at the respective DUs low-power slave GPS receivers that acquire and track GPS satellite signals using tracking assistance information provided by the base GPS receiver. Using the tracking assistance information, the slave GPS receivers can acquire and track GPS satellite signals that may be relatively weak at the receivers, due to conditions at the site, such as foliage canopies, and so forth. Further, as discussed below, the system operates the slave GPS receivers and processes associated range information such that the precise positions of the respective DUs are calculated and synchronized timing information is provided to each DU, even if the sky views of the respective slave GPS receivers are substantially reduced.

To determine the precise positions of a given DU, the associated slave GPS receiver uses the tracking assistance information to acquire and track GPS satellite signals from those satellites that are in the receiver's view. The slave GPS receiver then produces associated range information and provides the information to the data recording and control center. The data recording and control center collects the range information over an extended period of time, such as hours or days, as necessary. The center then batch processes the information, to produce a single computed position. By processing the information collected over an extended period of time, the system can determine the position of the slave GPS receiver to within the tight vertical and horizontal tolerances required for seismic measurements, as long as the slave GPS receiver is able to observe and collect data from at least two satellites simultaneously for 3 or 4 relatively short time intervals at various sky positions during the extended period. The batch processing thus eliminates the need to continuously track the GPS satellite signals and/or to track the signals from the same set of satellites over the respective intervals.

The data recording and control center thereafter provides the precise computed positions to the respective slave GPS receivers. The slave GPS receivers then use the position information and the tracking assistance information provided by the base GPS receiver to produce synchronized timing signals for use in controlling the collection of seismic data from the geophones. The timing signals include a 1 pulse per second strobe, which is tied to the codes in the GPS satellite signals, and the associated RS-232 time tag data. The timing signals remain synchronized over the system as long as a number of the slave GPS receivers individually continue to track the signals from at least one GPS satellite during a geophone data gathering operation. The slave GPS receivers that are tracking during the data gathering operation provide synchronized timing signals over the connecting cables to the neighboring non-tracking slave GPS slave receivers. Accordingly, the limit on cable lengths is essentially between the respective slave GPS receivers. This is in contrast to known prior systems in which the limit on the cable length must be met between the respective DUs and the control center.

The system thus provides precise positioning information for the respective DUs and synchronized timing signals for the collection of data from the geophones using relatively inexpensive slave GPS receivers that have their acquisition and tracking performance enhanced by the tracking assistance information provided by a single base GPS receiver. Further, the system produces the precise positioning information and the synchronized timing signals in an environment in which GPS receivers operating in a conventional manner typically can not do so, because of, for example, foliage cover that interferes with the receipt of the GPS satellite signals at the respective GPS receivers.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
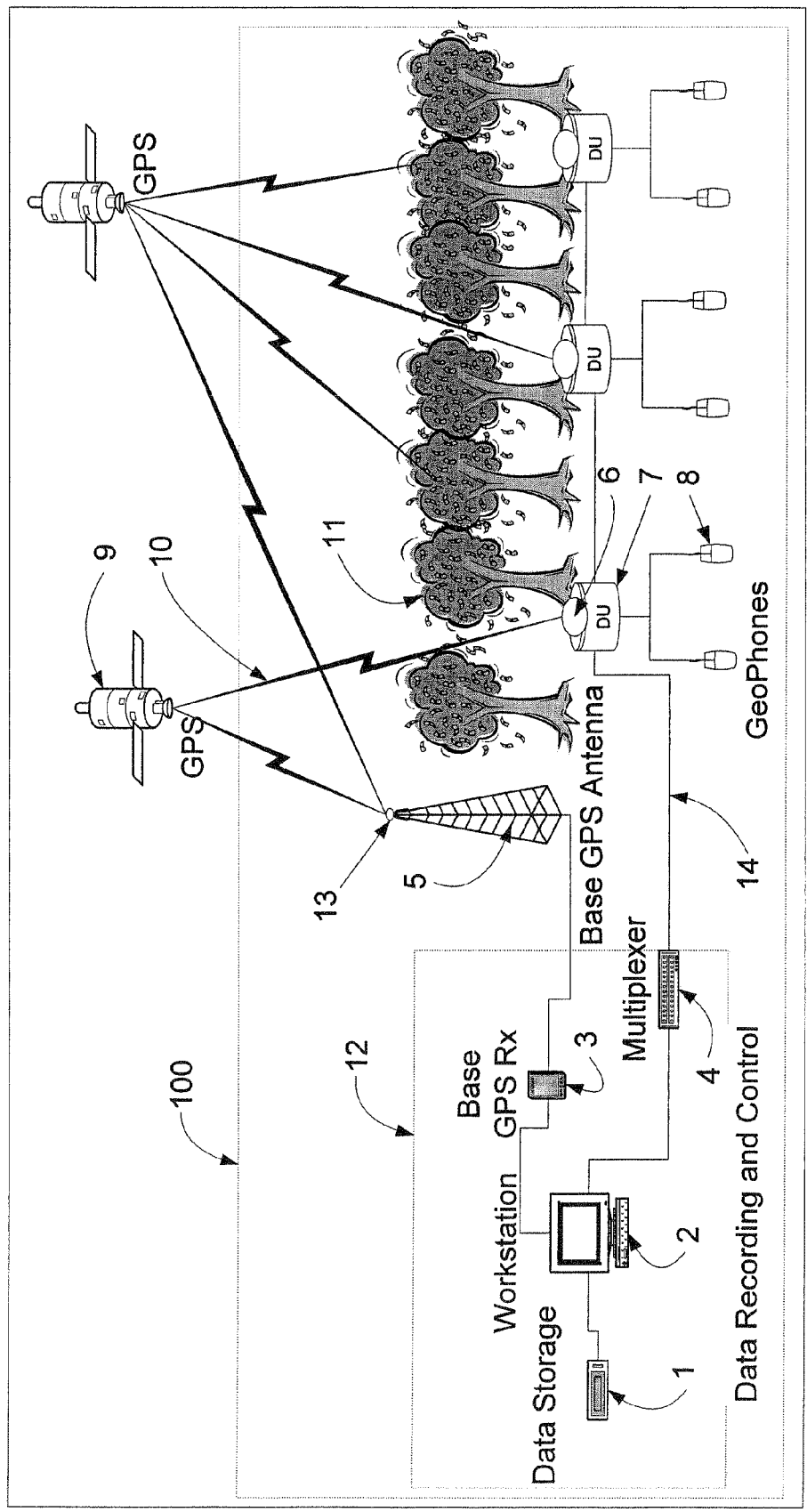
FIG. 1 is a functional block diagram of a seismic measuring system constructed in accordance with the invention.

Referring to the FIG. 1, a system 100 for collecting and analyzing seismic measurements is depicted. The system 100 includes a plurality of geophones 8 that supply seismic data to a data recording and control center 12 through DUs 7. The DUs are located in selected locations over a site of interest and are connected to the center by cables 14. The center 12 includes one or more workstations 2 and data storage devices 1 that process and store the data collected by the geophones. The signals from various cables 14 (only one of which is shown in the drawing) are supplied to the one or more workstations 2 through a multiplexer 4, which operates in a conventional manner. The system generally includes thousands of DUs, each with an associated configuration of geophones.

The data recording and control center 12 further includes a base Global Positioning System (GPS) receiver 3 that receives signals from various GPS satellites 9 using a base GPS antenna 13, which is positioned to have a clear view of the sky. As depicted in the drawing, an elevated tower 5 may be necessary to provide the GPS antenna 13 with a clear sky view. Slave GPS receivers 6, which may be relatively inexpensive low power L1 receivers, are located at the respective DUs 7. As discussed in more detail below, the slave GPS receivers 6 provide range information to the data recording and control center 12 and synchronized data collection timing signals to the DUs 7. As also depicted in the drawing, certain or all of the slave GPS receivers 6 are located under or near various trees 11, such that at any given time the signals 10 from GPS satellites 9 in certain sky locations may be unavailable or weakened at various slave GPS receivers.

The base GPS receiver 3 acquires and tracks the signals 10 from each of the GPS satellites in view, and at various times provides to the slave GPS receivers related tracking assistance information. The base GPS receiver provides as the tracking assistance information at least a list of the satellites then in view, and the associated Doppler frequency offsets and broadcast data symbols. The slave GPS receivers then use the tracking assistance information to acquire and track the signals from the various satellites using tracking loops with relatively narrow bandwidths. This allows the respective slave GPS receivers to utilize GPS satellite signals that are weak at the receivers. For example, the slave GPS receivers may acquire and track signals that are 10 to 15 dB lower than the signals required by GPS receivers operating in a conventional manner, that is, without tracking assistance.

Each slave GPS receiver 6 produces range information based on the satellite signals that the receiver can track at a given time, and the receiver provides the range information to the data recording and control center 12. The range information includes both code and carrier timing information for each of the signals being tracked. The center collects the range information over an extended period of time, for example, hours, days or weeks, and then batch processes the collected information, to calculate the precise latitude, longitude and height of the receiver. The center also calculates the quality of the collected range information, to ensure that the information used in the batch position calculations is sufficiently reliable, as discussed in more detail below.

As long as the slave GPS receiver has tracked at least two satellites simultaneously for 3 or 4 relatively short time intervals at different sky locations during the extended period, the batch processing of the range information calculates the position of the slave GPS receiver to within the tolerances required for seismic measurement. The batch processing thus allows the system to calculate the precise positions of the slave receivers without requiring that the slave GPS receiver continuously track the GPS satellite signals from multiple satellites and/or track the signals from the same set GPS satellites.

The data recording and control center 12 batch processes the range data collected from a given fixed-position slave GPS receiver, to compute a single position, i.e., latitude, longitude and height, and an associated position covariance. The batch processing involves multiple passes through the collected range data, with a first pass using all of the collected data, that is, all of the pseudorange and carrier phase information, to produce a global position estimate that is expected to be accurate to within 30 to 60 meters. As discussed, the accuracy is adversely affected by the overall quality of the range data. The range data is produced based on signals from the satellites that are in the view of the receiver at various times over an extended time period, that is, over a number of hours, days, and so forth. Generally, it is expected that range data will be collected over a period of between 8 and 24 hours. With slave GPS receiver's restricted view of the sky, because of foliage or other partial coverage, the receiver may not have the same set of satellites in view over much of the extended period and/or may not have more than one satellite in view at particular times. Further, some of satellite signals may be distorted by large multipath components attributed to signals that are reflected to the receiver by the foliage or other nearby obstructions.

As a next pass through the data, the data recording and control center refines the calculated position and position covariance using only the carrier phase measurements, which are less susceptible to multipath interference. The receiver starts with the estimated position and position covariance from the first pass and, in what is a computation intensive manner, resolves carrier cycle ambiguities to determine updated estimated positions and associated position covariances. The estimated position and the associated position covariance are updated at every code epoch in which two or more satellites are in view of the receiver, that is, when double differences can be calculated to resolve carrier cycle ambiguities. The accuracy of the position estimate at the end of the second pass is expected to be within 3 to 6 meters, with most of the error attributable to the height component.

The third pass through the data holds the position and position covariance fixed to the best estimate from pass two and, based on the carrier phase measurement, looks for perceived movement. The processing then selects for further processing data that are associated with little or no perceived movement. The processing may also selectively weight various data used in the further processing.

More specifically, the third pass processing calculates residuals of the double differenced carrier phase measurements with respect to the fixed position, and determines if the residuals show perceived movement. The residuals are accumulated over intervals in which there is continuity in the carrier phase measurement, that is, over periods in which there is no loss of lock or cycle slip. The processing determines measurement data is valid over a given interval if the sum of the squares of the residuals falls below a normalized threshold, and also, the rate of growth of the sum of the squares falls below a predetermined threshold. If both conditions are not met, the processing flags the associated series of carrier measurements as invalid for the entire interval between cycle slips. The processing may also assign weights to the respective measurements that are deemed valid. Thus, the processing may de-weight certain measurements to prevent correlated multipath errors, i.e., non-white noise errors, from adversely affecting the further processing. The de-weighting may, for example, take the form of using fewer of the measurements over a particular code epoch, i.e., one out of every four measurements, or using a larger standard deviation in the associated calculations.

The processing then recalculates the estimated position based on the results of the third pass. The system thus eliminates from the calculations the measurements that are flagged as invalid and assigns appropriate weights to the remaining measurements, and produces a new position estimate and associated position covariance.

The processing system next holds the position and position covariance fixed at the new estimates and repeats the third pass, that is, the processing step of determining the validity of and weightings for the measurements based on the associated residuals. In this step the system may accept as good measurements particular measurements that showed perceived movement relative to the prior estimated position and position covariance but do not with respect to the new estimates. The processing system then determines a next estimated position and associated position covariance using the updated weighting and validity determinations, and continues iterating in this manner, i.e., determining new weightings and a next estimate of position, until the estimated height changes by less than a predetermined threshold between iterations.

The batch processing operations are discussed in more detail in co-pending U.S. Provisional Application Ser. No. 60/588,099, entitled METHOD FOR POSITIONING USING GPS IN A RESTRICTIVE COVERAGE ENVIRONMENT, which is assigned to a common assignee and incorporated herein in its entirety by reference.

The batch processing performed by the system differs substantially from the processing performed in known assisted GPS, or A-GPS, systems, which also referred to as e911 systems. The A-GPS systems allow a GPS receiver in a cellular telephone essentially to determine an "instantaneous" position fix to within approximately 100 meters based on fast acquisition and tracking of signals simultaneously from 3 or 4 GPS satellites. The A-GPS systems are not designed to and do not meet the tight tolerances required for seismic measuring.

Referring still to FIG. 1, once the data recording and control center 12 has calculated the positions of the respective slave GPS receivers 6 to within the necessary tolerances, the center provides the positions to the receivers. The slave GPS receivers 6 then use their positions and the tracking assistance information supplied by the base GPS receiver to produce synchronized 1 pulse per second timing signals that correspond to the timing of the codes in the received GPS satellite signals and also produce the associated RS-232 time tag message associated with the 1 pulse per second signal. The DUs use the timing signals (1 pulse per second and time tag message) to control the collection of data from the geophones. A given slave GPS receiver need only track the signals from a single GPS satellite at any given time in order to produce timing signals that are tied to the GPS codes, and thus, the DUs and associated slave GPS receivers should be able to maintain their timing signals in synchronism across the entire system.

If at any given time one or more slave GPS receivers 6 fail to track the satellite signals, the system will still be able to gather data from the geophones by providing synchronized timing signals from nearby tracking slave GPS receivers to the non-tracking slave GPS receivers over the connecting cables 14. The slave GPS receivers may each send timing information over the cables, such that a given receiver can use its own timing information or the received timing information, as appropriate. The received timing signals remain synchronized as long as the receiver providing the timing signals is within approximately 1 kilometer of the receiver that must rely on the received signals.

An alternative configuration of the system may use one of the receivers situated at the DUs as the source of the tracking assistance information. Thus, if a DU is located where there is a relatively clear view of the sky, the installer may configure this receiver to supply the tracking assistance information to the various slave GPS receivers. Accordingly, in this configuration, the base GPS receiver 3, base GPS antenna 13 and the elevating tower 5 may not be necessary. As appropriate, the system may instead use two or more of the receivers situated at the DUs as sources of the tracking assistance information, with selected receivers being the source of the tracking assistance information for GPS satellites in particular regions of the sky.

Figure 2:
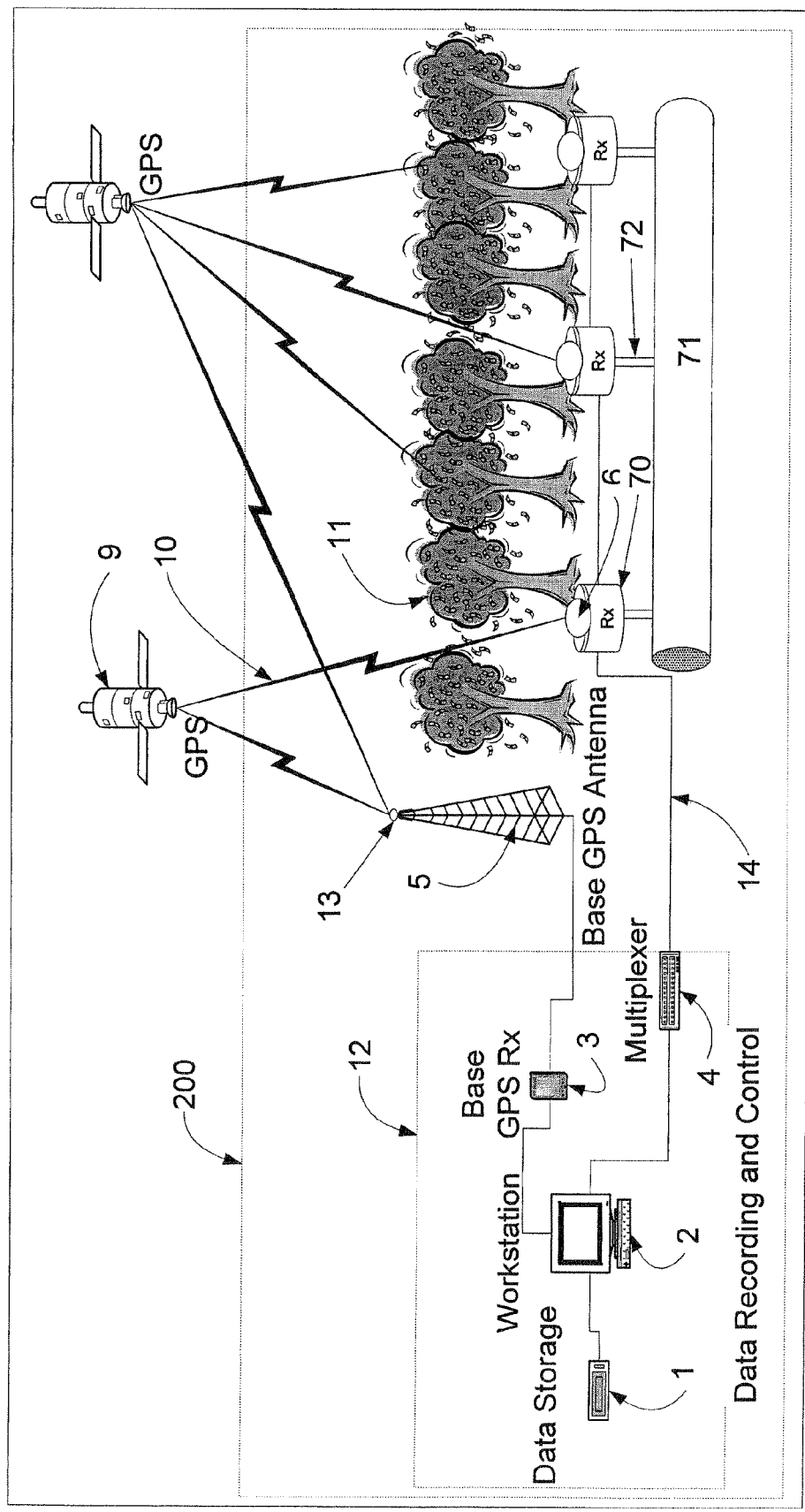
FIG. 2 is a functional block diagram of a deformation monitoring system constructed in accordance with the invention.

The system, in either configuration, may also be used to perform deformation monitoring. Deformation monitoring checks the movements of essentially fixed points of interest, such as bridges, dams, buildings, pipelines, and so forth, that may be located on potentially unstable ground. Referring now to FIG. 2, the deformation monitoring system 200 includes one or more base GPS receivers 3 with clear views to the sky that provide tracking assistance information and a plurality of slave GPS receivers 6 that act as monitoring devices. The slave GPS receivers are rigidly attached by poles 72 to a pipe 71, which is buried. Signal receivers 70 provide signals to and receive signals from the GPS receivers 6 and the cables 14. The data recording and control center 12 collects range information from the respective base and slave GPS receivers and batch processes the range information, to determine the precise positions of the respective slave GPS receivers along the pipe 71. The respective slave receivers continue to track the satellite signals, with the tracking assistance provided by the base GPS receiver or receivers, and provide range information to the data recording and control center. The center then determines if there are changes in the positions of the respective slave GPS receivers that indicate deformation.

The signal receivers 70 in the deformation monitoring system may also provide to the data recording and control center 12 other types of measurement data from secondary measurement devices, such strain gauges or tilt meters (not shown) that are attached to pipe 71. For this type of data, the data recording and control center may provide timing signals over the cables 14 to time tag movement "events," such as earthquakes. Should the system require measurement timing signals with more precision than can be provided over the cables, for the measurements made by these or other secondary devices, the system may instead use timing signals produced by the slave GPS receivers.

The system described above, whether used for seismic measurement or deformation monitoring, has as one of its advantages locally producing, at each slave GPS receiver, timing signals that are synchronized over the entire system. As discussed, cable length limitations are avoided by providing timing signals from a neighboring slave GPS receiver to a slave GPS receiver that has lost its timing signal by failing to continuously track the GPS satellites. Further, the slave GPS receivers produce the timing signals in environments with restricted sky views, using the tracking assistance information provided by the base GPS receivers, and thus, can operate in areas in which conventional GPS receivers are ineffective. These advantages are provided regardless of how the precise positions of the slave GPS receivers are determined. Thus, certain or all of the advantages of the system are achieved using other batch processing techniques to determine the precise positions of the slave GPS receivers or determining the positions using conventional, though time and labor intensive, methods such as surveying.

Also, the system may operate without providing the tracking assistance information to the slave GPS receivers. In these operations the base GPS receiver provides to the data recording and control center range information, that is, pseudorange and carrier measurement information, to be used in the double difference calculations made during the batch processing. The slave GPS receivers initially operate in a conventional manner to acquire and track satellite signals from the satellites in view. The slave GPS receivers provide the associated range information to the data recording and control center and the center performs the batch processing, as discussed above. Thereafter, the center provides the slave GPS receivers with the position information, and the slave GPS receivers continue to acquire and track the satellite signals based on this position information. The slave GPS receivers operating in this manner, i.e., without tracking assistance, will have more difficulty continuously tracking the satellite signals. Accordingly, more of the slave GPS receivers will require timing signals from nearby receivers in order to provide synchronized timing signals to the DUs. However, the system operating in this manner is able to determine the precise positions of the slave GPS receivers, although the length of the extended period required to collect the range information will be longer when the tracking assistance is not provided to the slave GPS receivers.

What is claimed is:

1. A system comprising
  one or more base satellite signal receivers and associated antennas with substantial views of the sky, the base satellite signal receivers acquiring and tracking satellite signals and producing range data;
  a plurality of fixed-position satellite signal receivers, with one or more of the fixed-position satellite signal receivers operating in locations in which at various times the signals from the satellites in certain sky locations are unavailable, weakened or corrupted by multipath at the one or more fixed-position satellite signal receivers, the fixed-position satellite signal receivers acquiring and tracking satellite signals and producing range data; and
  a data recording and control center for
    collecting the range data from the one or more base receivers and the fixed-position receivers over an extended period of time and, for a given fixed position satellite signal receiver, batch processing the range data from at least three different intervals associated with different sky positions in which the given fixed position receiver is simultaneously tracking signals from any two satellites and calculating a three-dimensional position of the given fixed-position satellite signal receiver, and
    recording the position of the given fixed-position receiver.

2. The system of claim 1 wherein the data recording and control center further returns the position to the given fixed-position receiver.

3. The system of claim 1 wherein the data recording and control center further
  determines that range data associated with the intervals that correspond to perceived movement are invalid; and
  calculates position using valid range data.

4. The system of claim 1 wherein the data recording and control center determines the position using calculations involving carrier phase measurements.

5. The system of claim 1 wherein the data recording and control center uses range data produced by the one or more base satellite signal receivers in double difference calculations during the batch processing.

6. The system of claim 1 wherein the data recording and control center utilizes the range data accumulated over intervals in which there is continuity in the carrier phase measurements.

7. The system of claim 6 wherein the data recording and control center further
  determines that range data associated with the intervals correspond to perceived movement are invalid; and
  calculates position using valid range data.

8. A system comprising
  a plurality of base satellite signal receivers that together have substantial views of the sky, with a given base satellite signal receiver having a substantial view of at least a portion of the sky, the plurality of base satellite signal receivers producing range data;
  a plurality of fixed-position satellite signal receivers operating in locations in which at various times the signals from the satellites in certain sky locations are unavailable, weakened or corrupted by multipath at the one or more slave satellite signal receivers, the slave satellite signal receivers producing associated range data; and
  a data recording and control center for
    collecting the range data from the base satellite signal receivers and the fixed-position receivers over an extended period of time and for a given fixed position satellite signal receiver, batch processing the range data from at least three different intervals associated with different sky positions in which the given fixed position receiver is simultaneously tracking signals from any two satellites and calculating a three-dimensional position of the given fixed-position satellite signal receiver, and
    recording the position of the given fixed-position receiver.

9. The system of claim 8 wherein the data recording and control center returns the calculated position to the given fixed-position satellite signal receiver.

10. The system of claim 9 wherein the fixed-position receiver uses the calculated positions to acquire and track the satellite signals.

11. A method including:
  acquiring and tracking satellite signals and producing range data at one or more fixed-position locations using receivers that are configured to acquire and track satellite signals, with one or more of the locations having restricted views of the sky;
  acquiring and tracking satellite signals and producing range data from one or more base locations that have substantially clear views of at least respective portions of the sky using receivers that are configured to acquire and track satellite signals;
  collecting, using one or more processors at a data recording and control center, the range information from the fixed-position locations and the base locations over an extended period of time and, for a given fixed position satellite signal receiver, batch processing the range data from at least three different intervals associated with different sky positions in which the given fixed position receiver is simultaneously tracking signals from any two satellites and calculating a three-dimensional position of the given fixed-position satellite signal receiver; and storing the calculated positions.

12. The method of claim 11 further including returning the calculated position to the given fixed-position location; and at the given fixed position location utilizing the calculated position to acquire and track satellite signals.

13. The method of claim 11 wherein the step of batch processing includes determining that respective range data that correspond to perceived movement are invalid, and calculating position using valid range data.

14. The method of claim 11 wherein the step of batch processing includes using calculations involving carrier phase measurements.

15. The method of claim 14 wherein the step of batch processing uses range data from the one or more base locations in double difference calculations.

16. The method of claim 15 wherein the step of batch processing utilizes range data accumulated over intervals in which there is continuity in the carrier phase measurements and determines that respective range data are invalid over a given interval if the range data are associated with perceived movement.

* * * * *